US008116096B2

(12) United States Patent
Tang

(10) Patent No.: US 8,116,096 B2
(45) Date of Patent: Feb. 14, 2012

(54) SURFACE CONTACT CARD RETENTION ASSEMBLY AND PORTABLE ELECTRONIC DEVICE USING THE SAME

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 422 days.

(21) Appl. No.: 12/399,210

(22) Filed: Mar. 6, 2009

(65) Prior Publication Data

US 2010/0091455 A1 Apr. 15, 2010

(30) Foreign Application Priority Data

Oct. 10, 2008 (CN) .......................... 2008 1 0304879

(51) Int. Cl.
*H05K 7/14* (2006.01)

(52) U.S. Cl. ..................... 361/802; 439/595; 455/575.3; 248/459

(58) Field of Classification Search .................. 439/630, 439/631, 327, 330, 326, 595; 235/441, 475, 235/482, 486, 380, 419; 455/558, 575.1, 455/575.3, 569.1; 361/816, 800, 737, 741, 361/756, 679.58, 679.32, 679.4, 748, 759; 174/350, 368; 248/220.21, 110, 459, 371, 248/286.1

See application file for complete search history.

(56) References Cited

U.S. PATENT DOCUMENTS

2004/0229511 A1* 11/2004 Chen ............................ 439/638
2005/0106925 A1* 5/2005 Liu ............................... 439/366
2010/0110648 A1* 5/2010 Tang ............................ 361/759

FOREIGN PATENT DOCUMENTS

CN 1996768 A 7/2007

* cited by examiner

*Primary Examiner* — Hung Duong
(74) *Attorney, Agent, or Firm* — Altis Law Group, Inc.

(57) ABSTRACT

A retention assembly for securing a surface contact card in a portable electronic device includes a main body and a locking member. The main body defines a receiving groove in the main body. The locking member includes a fixing portion fixed on the main body adjacent to the receiving groove, and a pressing portion connected to the fixing portion. When the pressing portion is pressed by an external force, the pressing portion is moved close to the fixing portion. When the external force is released, the pressing portion is moved away from the fixing portion.

16 Claims, 6 Drawing Sheets

SURFACE CONTACT CARD RETENTION ASSEMBLY AND PORTABLE ELECTRONIC DEVICE USING THE SAME

BACKGROUND

1. Technical Field

The present disclosure generally relates to retention assemblies for securing a surface contact card, such as a subscriber identification module card, to a portable electronic device.

2. Description of Related Art

Surface contact cards, such as subscriber identity module cards (SIM), compact flash cards, and multimedia cards having special circuits, are widely used in portable electronic devices, such as mobile telephones, to enhance or specialize the functions of the portable electronic devices. For example, a SIM card is placed in a mobile phone to dedicate the mobile phone's functions to the SIM card owner.

Referring to FIG. 6, a typical retention assembly (not labeled) for securing a SIM card (not shown) in a mobile telephone includes a base plate 31, and a locking member 32. The base plate 31 defines a receiving groove 311 to receive the SIM card. The locking member 32 includes a pressing plate 321, an elastic portion 323 connected to the pressing plate 321, and an operating portion 325 formed on the pressing plate 321. The locking member 32 is positioned on the base plate 31 adjacent to the receiving groove 311.

When an external force is applied on the operating portion 325 to compress the elastic portion 323, the pressing plate 321 is moved away from the receiving groove 311, and the SIM card may be received in the receiving groove 311. When the external force is released, the pressing plate 321 is moved on top of the receiving groove 311 due to the elastic force created by the elastic portion 323, thereby securing the SIM card in the receiving groove 311.

However, when using the typical retention assembly, a user may need one hand to push the operating portion 325, and the other hand to put in or take out the SIM card simultaneously. In addition, a relatively large force may be needed to push the operating portion 325 and compress the elastic portion 323. Therefore, it is inconvenient to assemble or disassemble the SIM card.

Therefore, a retention assembly which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

The present retention assembly may be used for securing a surface contact card in a portable electronic device. Hereinafter, for the purposes of conveniently describing the embodiments of the retention assembly, the retention assembly as used for securing a SIM card in a mobile phone is described and illustrated.

Figure 1:
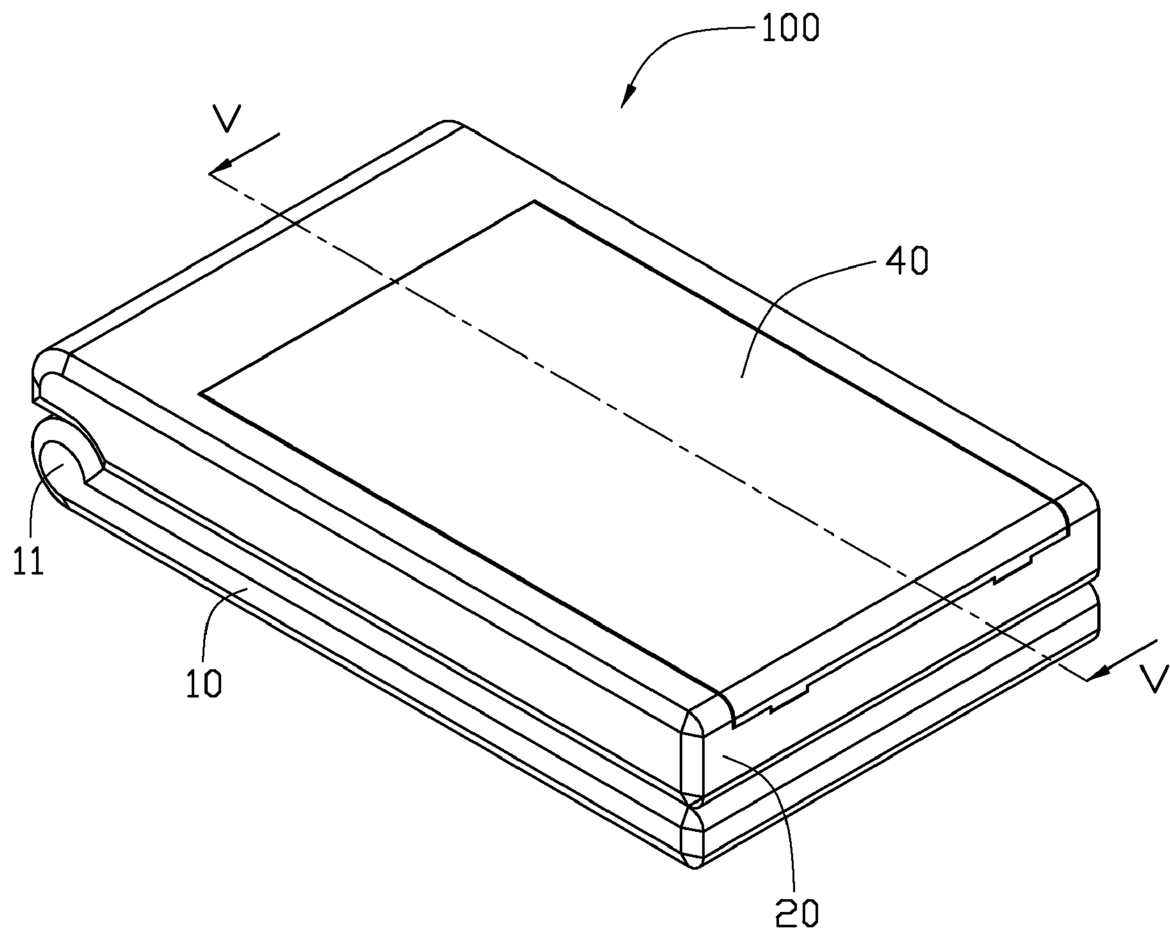
FIG. 1 is an assembled, isometric view of an embodiment of a mobile phone including a retention assembly, and a locking member.
Figure 2:
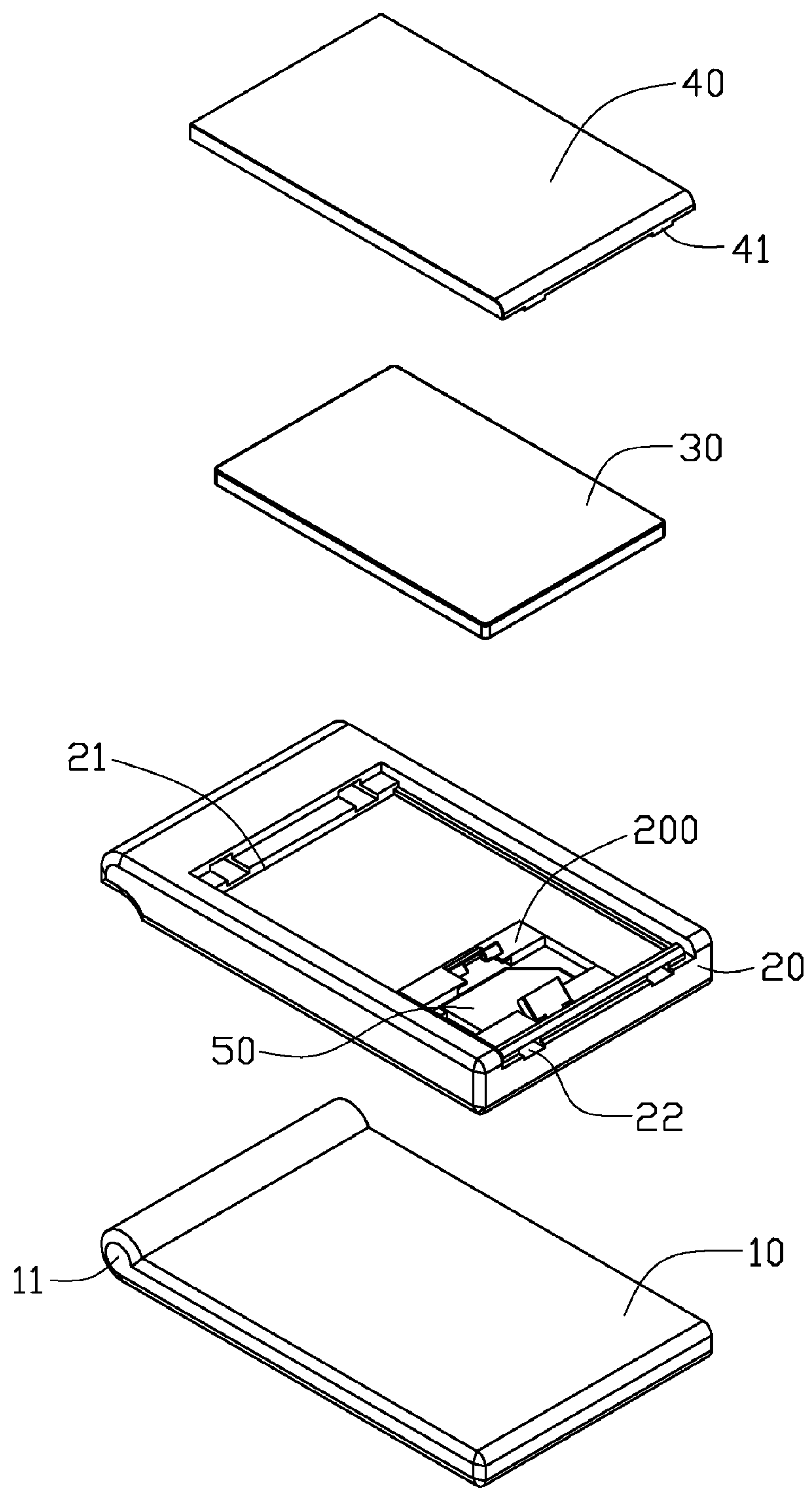
FIG. 2 is an exploded, isometric view of the mobile phone in FIG. 1.

Referring to FIGS. 1 and 2, an embodiment of a mobile phone 100 includes a first main body 10, a second main body 20, a battery 30, a battery cover 40, a SIM card 50, and an embodiment of a retention assembly 200. The second main body 20 is pivotally connected to the first main body 10 via a hinge 11. The second main body 20 defines a battery groove 21 to receive the battery 30, and a plurality of latching grooves 22 adjacent to the battery groove 21. A plurality of latching hooks 41 is formed on the battery cover 40 to engage in the latching grooves 22 of the second main body 20, so that the battery cover 40 is shielding the battery 30. The SIM card 50 is secured in the battery groove 21 by the retention assembly 200.

Figure 3:
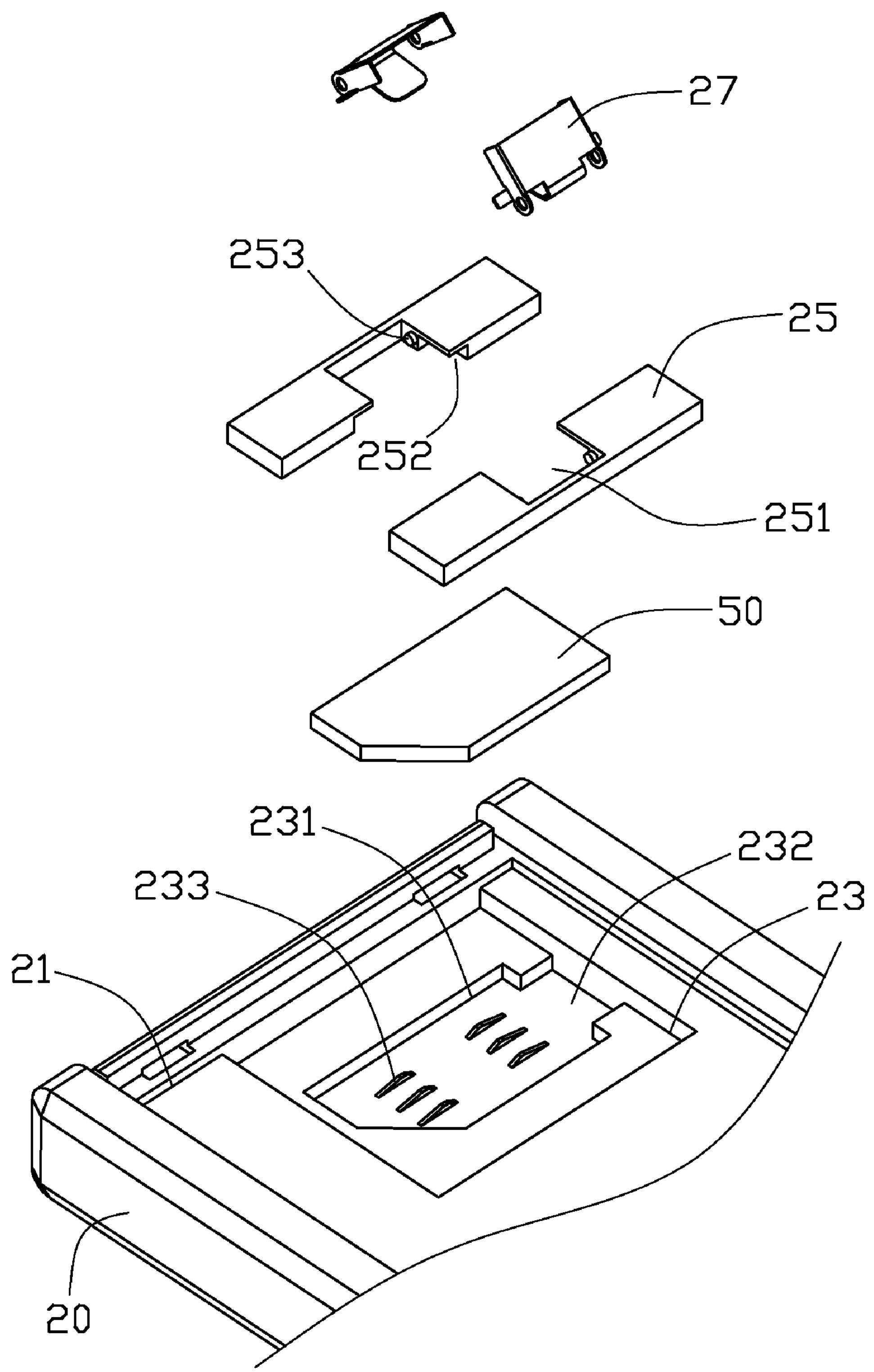
FIG. 3 is a partial, exploded, isometric view of the mobile phone in FIG. 1.

Referring to FIG. 3, the retention assembly 200 includes a pair of fixing members 25, and a pair of locking members 27. A fixing groove 23 is defined in a bottom surface of the battery groove 21, to receive the fixing members 25 and the locking members 27. A receiving groove 231 is defined in a bottom surface of the fixing groove 23, to receive the SIM card 50.

A plurality of contacts 233 are positioned on a bottom surface of the receiving groove 231. In the illustrated embodiment, the contacts 233 are metallic elastic pieces. The receiving groove 231 has a similar shape as the SIM card 50, so that the SIM card 50 can be received in the receiving groove 231 and electrically connected to the contacts 233. A depth of the receiving groove 231 is substantially equal to a thickness of the SIM card 50. In one embodiment, the bottom surface of the fixing groove 23 also defines an opening groove 232 communicating with the receiving groove 231, to facilitate assembling or disassembling the SIM card 50.

Each fixing member 25 may be a substantially elongated plate, and defines a mounting groove 251 in a middle portion of the fixing member 25, and two limiting grooves 252 in opposite sides of the mounting groove 251. Two protruding posts 253 are formed on opposite sidewalls of the mounting groove 251. In the illustrated embodiment, the protruding post 253 is a substantially columnar post. In an alternative embodiment, the pair of the fixing members 25 may be integrally formed with the second main body 20, thus the fixing groove 23 may be omitted.

Figure 4:
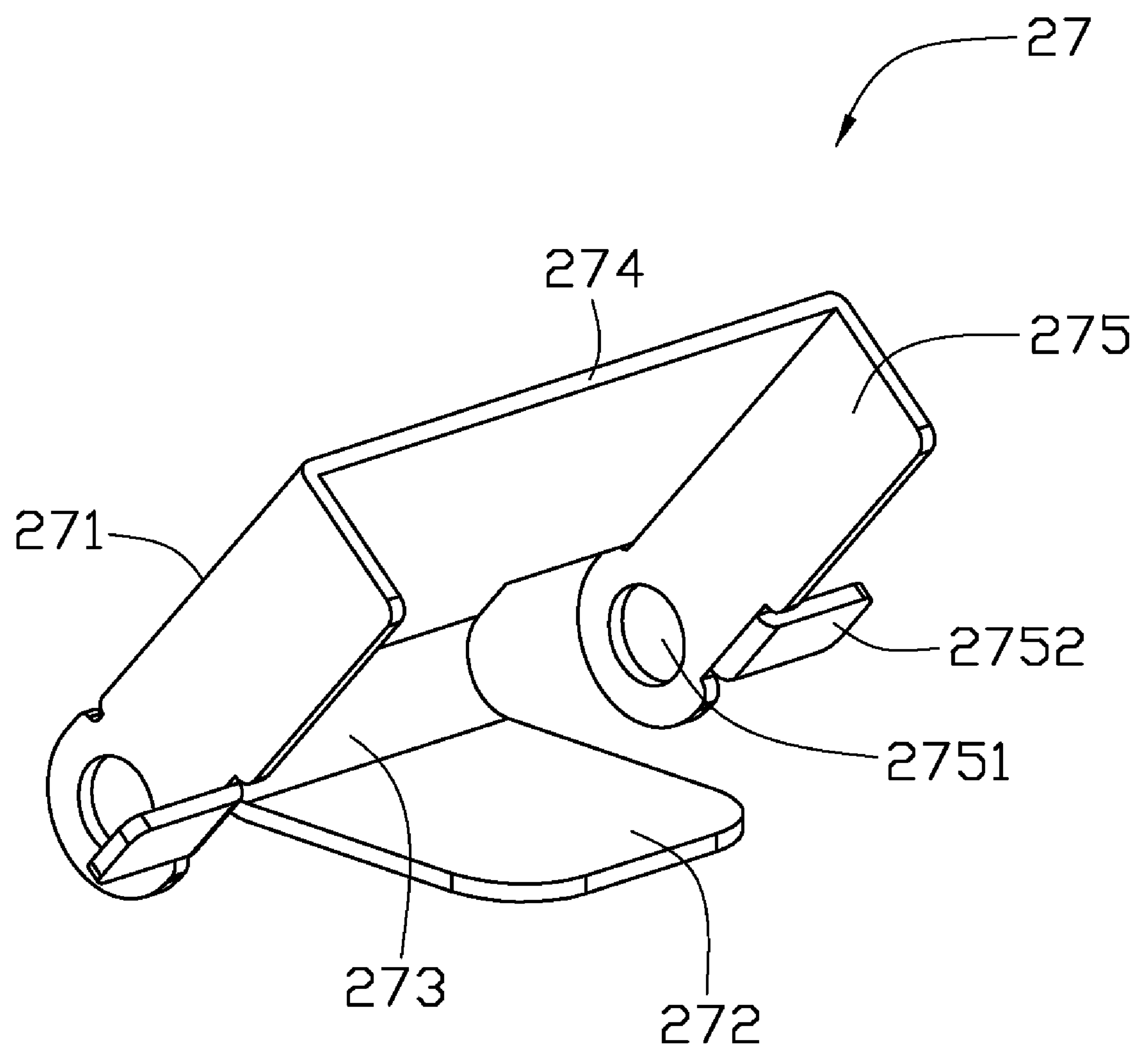
FIG. 4 is an isometric view of the locking member of the retention assembly of the mobile phone in FIG. 3.

Referring to FIG. 4, each locking member 27 includes a pressing portion 271, a fixing portion 272, and an elastic portion 273 connecting the pressing portion 271 and the fixing portion 272. The pressing portion 271 includes a top plate 274 and two side plates 275 extending substantially perpendicularly from opposite ends of the top plate 274. Each side plate 275 includes a circular hole 2751 defined in an end adjacent to the elastic portion 273, and a limiting tab 2752 formed on the end adjacent to the circular hole 2751. A length of the pressing portion 271 is longer than that of the fixing portion 272. The elastic portion 273 can deform elastically. The pressing portion 271 moves close to the fixing portion 272 when the top plate 274 is pressed by an external force. When the external force is released, the pressing portion 271 moves away from the fixing portion 272 due to an elastic force created by the elastic portion 273. In an alternative embodiment, the pressing portion 271 and the fixing portion 272 may be connected via other elastic members, such as a torsion spring.

In assembly, the fixing members 25 are fixed in two ends of the fixing groove 23. The locking members 27 are mounted in the mounting grooves 251 of the fixing members 25. The protruding posts 253 of the fixing members 25 are inserted through the circular holes 2751 of the locking members 27, such that the side plates 275 of the locking members 27 are rotatable around the protruding posts 253. The limiting tabs 2752 of the locking members 27 are inserted in the limiting grooves 252 of the fixing members 25, thereby limiting a rotation angle of the side plates 275.

Figure 5:
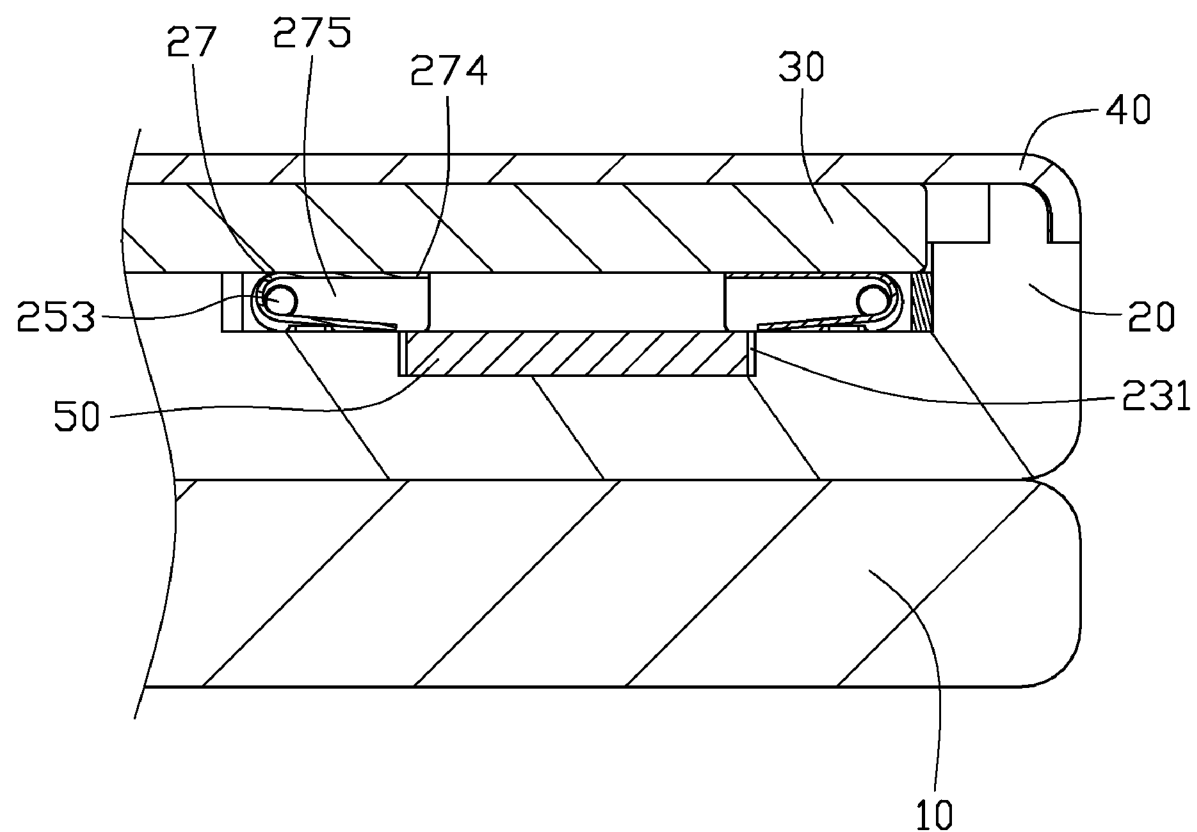
FIG. 5 is a cross-sectional view of the mobile phone taken along line V-V in FIG. 1.
Figure 6:
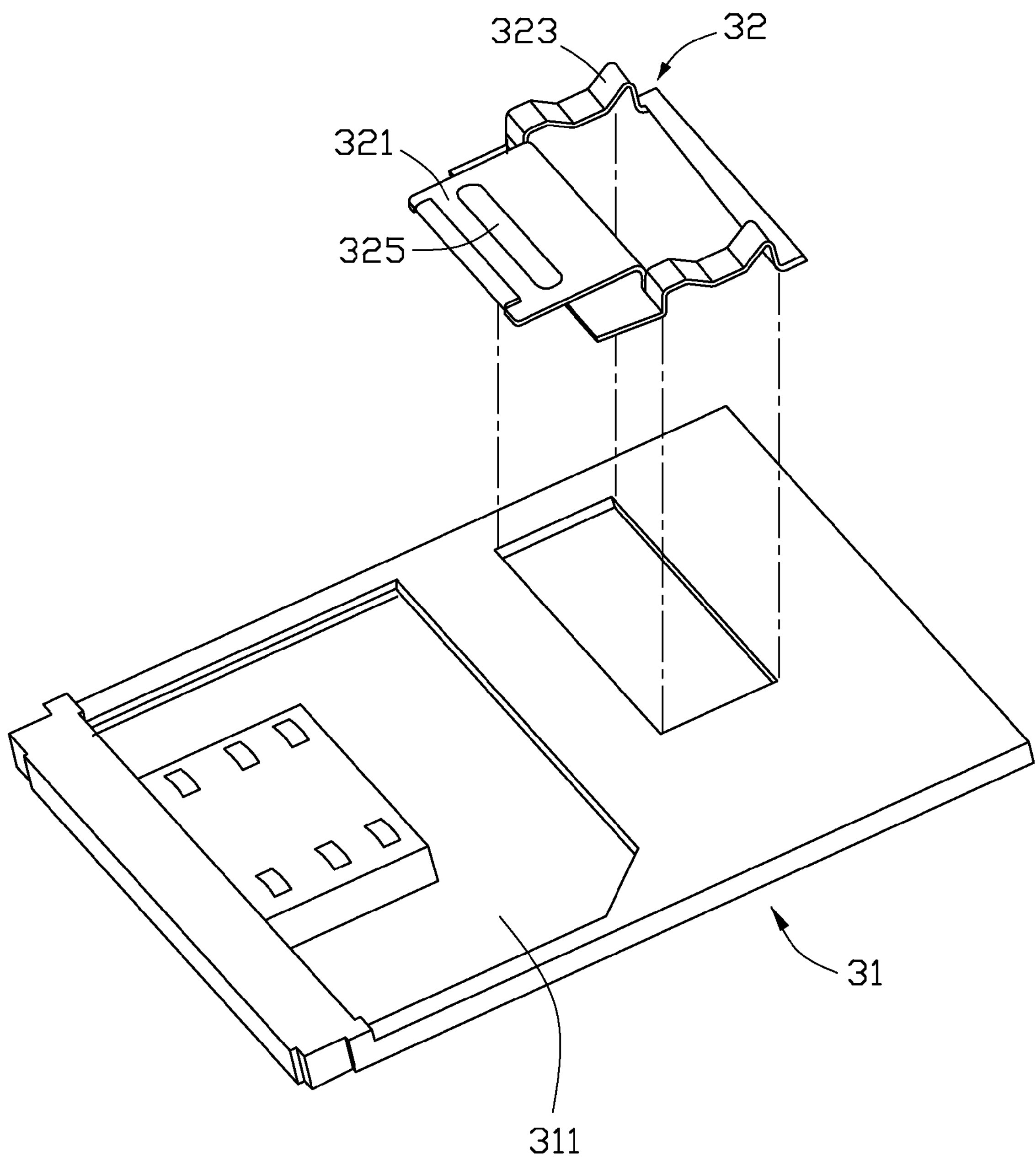
FIG. 6 is an exploded, isometric view of a typical retention assembly.

Referring also to FIG. 5, the SIM card 50 is positioned in the receiving groove 231. The battery 30 is positioned in the battery groove 21. The latching hooks 41 are engaged in the latching grooves 22, thereby fixing the battery cover 40 on top of the battery 30. The top plates 274 of the locking members 27 are pressed by the battery 30, so that the pressing portion 271 moves close to the fixing portion 272, and the side plates 275 rotates around the protruding posts 253, until the SIM card 50 is tightly pressed by the side plates 275. The SIM card 50 is secured in the receiving groove 231 via a force created by the locking member 27 and the elastic force created by the contacts 233. Since opposite ends of the SIM card 50 are pressed by the locking member 27, the SIM card 50 is reliably secured in the receiving groove 231 and has a good shock resistance capability.

In addition, the SIM card 50 can be easily taken out of the receiving groove 231 by detaching the battery cover 40 and the battery 30 from the second main body 20. The force applied on the top plates 274 of the locking members 27 are released, the pressing portion 271 moves away from the fixing portion 272, and the SIM card 50 is partially pushed out of the receiving groove 231 by the elastic force created by the contacts 233.

In alternative embodiments, the fixing portion 272 of the locking members 27 may be fixed on the bottom surface of the fixing groove 23 adjacent to the receiving groove 231, thus the fixing members 25, the circular holes 2751, and the limiting tabs 2752 may all be omitted. The locking member 27 may include a protruding portion formed on the top plate 274, thus the side plates 275 may be omitted. When the protruding portion is pressed by the battery 30, the top plate 274 is moved close to the fixing portion 272, until the SIM card 50 is pressed by the top plate 274. When the retention assembly 200 is applied in other portable electronic devices, the battery 30 may be substituted by an abutting member, to provide the pressing force to the locking members 27. The battery cover 40 may be substituted by an abutting plate, to engage with the second main body 20.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A retention assembly for securing a surface contact card in a portable electronic device, the retention assembly comprising:

a main body defining a receiving groove therein; and a locking member comprising:

a fixing portion fixed on the main body adjacent to the receiving groove;

a pressing portion connected to the fixing portion;

wherein when the pressing portion is pressed by an external force, the pressing portion is moved close to the fixing portion; when the external force is released, the pressing portion is moved away from the fixing portion.

2. The retention assembly of claim 1, wherein the locking member further comprises an elastic portion connecting the pressing portion to the fixing portion.

3. The retention assembly of claim 2, wherein the elastic portion is a torsion spring.

4. The retention assembly of claim 1, wherein the main body defines a fixing groove therein; the receiving groove is defined in a bottom surface of the fixing groove.

5. The retention assembly of claim 4, wherein the retention assembly further comprises a fixing member fixed in the fixing groove; the fixing member defines a mounting groove, and the locking member is mounted in the mounting groove.

6. The retention assembly of claim 5, wherein the pressing portion of the locking member comprises a top plate, and two side plates extending substantially perpendicularly from opposite ends of the top plate; each side plate defines a circular hole in an end adjacent to the fixing portion; the fixing member comprises two protruding posts formed on opposite sidewalls of the mounting groove; each protruding post is inserted in each circular hole.

7. The retention assembly of claim 5, wherein the pressing portion of the locking member comprises a top plate, and two side plates extending substantially perpendicularly from opposite ends of the top plate; a limiting tab is formed on an end of each side plate and adjacent to the fixing portion; the fixing member defines two limiting grooves in opposite sides of the mounting groove; the limiting tab is inserted in each limiting groove.

8. The retention assembly of claim 4, wherein the bottom surface of the fixing groove defines an opening groove communicating to the receiving groove.

9. The retention assembly of claim 1, wherein the pressing portion of the locking member comprises a top plate, and a protruding portion formed on the top plate.

10. A portable electronic device, comprising:

a main body;

an abutting member fixed on the main body; and a retention assembly for securing a surface contact card in the main body, comprising:

a receiving groove defined in the main body;

a locking member comprising a fixing portion fixed on the main body adjacent to the receiving groove, and a pressing portion connected to the fixing portion;

wherein when the pressing portion is pressed by the abutting member, the pressing portion is moved close to the fixing portion; when the pressing portion is not pressed by the abutting member, the pressing portion is moved away from the fixing portion.

11. The portable electronic device of claim 10, wherein the portable electronic device further comprises an abutting plate to shield the abutting member; a plurality of latching hooks is formed on the abutting plate; the main body defines a plurality of latching grooves to engage with the plurality of latching hooks.

12. The portable electronic device of claim 10, wherein the locking member further comprises an elastic portion connecting the pressing portion to the fixing portion.

13. The portable electronic device of claim 10, wherein the main body defines a fixing groove; the receiving groove is defined in a bottom surface of the fixing groove.

14. The portable electronic device of claim 13, wherein the retention assembly further comprises a fixing member fixed in the fixing groove, the fixing member defines a mounting groove, and the locking member is mounted in the mounting groove.

15. The portable electronic device of claim 14, wherein the pressing portion of the locking member comprises a top plate, and two side plates extending substantially perpendicularly from opposite ends of the top plate; each side plate comprises a circular hole defined in an end adjacent to the fixing portion, and a limiting tab formed on an end adjacent to the circular hole; the fixing member comprises two protruding posts formed on opposite sidewalls of the mounting groove, and two limiting grooves defined in opposite sides of the mounting groove; each protruding post is inserted in each circular hole; the limiting tab is inserted in each limiting groove.

16. The portable electronic device of claim 13, wherein the bottom surface of the fixing groove defines an opening groove communicating to the receiving groove.

* * * * *